US006171532B1

(12) United States Patent
Sterzel

(10) Patent No.: US 6,171,532 B1
(45) Date of Patent: Jan. 9, 2001

(54) METHOD OF STABILIZING SINTERED FOAM AND OF PRODUCING OPEN-CELL SINTERED FOAM PARTS

(75) Inventor: Hans-Josef Sterzel, Dannstadt-Schauernheim (DE)

(73) Assignee: BASF Aktiengesellschaft, Ludwigshafen (DE)

(*) Notice: Under 35 U.S.C. 154(b), the term of this patent shall be extended for 0 days.

(21) Appl. No.: 09/180,743

(22) PCT Filed: May 12, 1997

(86) PCT No.: PCT/EP97/02412

§ 371 Date: Nov. 17, 1998

§ 102(e) Date: Nov. 17, 1998

(87) PCT Pub. No.: WO97/44292

PCT Pub. Date: Nov. 27, 1997

(30) Foreign Application Priority Data

May 17, 1996 (DE) ............................................. 196 19 986

(51) Int. Cl.$^7$ ........................... C04B 38/02; C04B 38/06
(52) U.S. Cl. .................................. 264/43; 264/44; 419/2; 521/82; 521/91; 521/92; 521/94; 521/919
(58) Field of Search .................. 264/43, 44; 521/82, 521/91, 92, 94, 919; 419/2

(56) References Cited

U.S. PATENT DOCUMENTS

| 3,947,550 | * | 3/1976 | Fitchmun . | |
|---|---|---|---|---|
| 4,697,632 | | 10/1987 | Lirones | 164/369 |
| 4,866,011 | | 9/1989 | Hargus et al. | 501/82 |
| 4,871,495 | | 10/1989 | Helferich et al. | 264/43 |
| 4,885,263 | | 12/1989 | Brockmeyer et al. | 501/81 |
| 4,912,076 | | 3/1990 | Mixrah et al. | 502/300 |
| 5,033,939 | * | 7/1991 | Brasel | 264/44 |
| 5,045,511 | | 9/1991 | Bosomworth et al. | 501/85 |
| 5,066,432 | | 11/1991 | Gabathuler et al. | 264/28 |
| 5,217,939 | | 6/1993 | Campbell | 502/339 |
| 5,242,882 | | 9/1993 | Campbell | 502/325 |
| 5,256,387 | | 10/1993 | Campbell | 423/392 |
| 5,336,656 | | 8/1994 | Campbell | 502/329 |

FOREIGN PATENT DOCUMENTS

| 3510170 | 3/1985 | (DE) . |
| 3731888 | 9/1987 | (DE) . |
| 3835807 | 10/1987 | (DE) . |
| 3732654 | 4/1989 | (DE) . |
| 3816893 | 6/1989 | (DE) . |
| 3934496 | 10/1989 | (DE) . |
| 157974 | 10/1985 | (EP) . |
| 261070 | 3/1988 | (EP) . |
| 312501 | 4/1989 | (EP) . |
| 330963 | 9/1989 | (EP) . |
| 341203 | 11/1989 | (EP) . |
| 440322 | 2/1990 | (EP) . |
| 412 673 | 2/1991 | (EP) . |
| 412931 | 2/1991 | (EP) . |
| 445067 | 9/1991 | (EP) . |
| 60-221371 | 4/1984 | (JP) . |
| 61-295283 | 6/1985 | (JP) . |
| 2290211 | 4/1989 | (JP) . |
| 88/07403 | 10/1988 | (WO) . |
| 89/05285 | 6/1989 | (WO) . |
| 95/11752 | 5/1995 | (WO) . |

* cited by examiner

Primary Examiner—James Derrington
(74) Attorney, Agent, or Firm—Keil & Weinkauf

(57) ABSTRACT

In a process for stabilizing a foamed starting slip material, the starting slip material which is foamed comprises the following constituents:
a. inorganic sinterable material,
b. a source of blowing gas,
c. a framework former which forms a framework when the pH of the starting slip material is changed,
d. pH control material,
e. liquid,
f. if desired, one or more of the following materials:
  dispersant
  binder
  viscosity modifier, and
the pH of the starting slip material is changed to initiate or accelerate the formation of the framework from the framework former.

9 Claims, No Drawings

METHOD OF STABILIZING SINTERED FOAM AND OF PRODUCING OPEN-CELL SINTERED FOAM PARTS

The present invention relates to the stabilization of foamed starting slip materials. In addition, the invention relates to a process for producing inorganic sintered foam parts.

Open-celled inorganic foams are known. They are produced by a variety of processes having hitherto insurmountable drawbacks and therefore such high costs that they are used only in special cases. The process which is claimed by far the most comprises infiltrating open-celled polymer foams with a slip material containing inorganic particles. The infiltrated polymer foam, usually a polyurethane foam, is carefully dried and the organic constituents are removed by slow controlled heating and the negative comprising inorganic powder is sintered. This is the reason for the complicated, expensive production. Both the drying of the pore structure filled with slip material and the pyrolytic removal of the organic constituents are very time consuming. In addition, the thicknesses of the material are restricted to a few centimeters because of the slow drying and pyrolysis. The production of such foams is described, for example, in DE-A 39 34 496 or EP-A 157 974. EP-A 440 322 describes the complicated technology for producing open-celled ceramic foams by means of an arrangement of rollers for the infiltration and for compressing the infiltrated polymer foams.

A wide variety of applications are known for inorganic foams owing to their high temperature resistance and resistance to various media. Thus, DE-A 37 32 654, U.S. Pat. Nos. 5,336,656, 5,256,387, 5,242,882 and 5,217,939 describe ceramic foams as supports for catalysts, e.g. for flue gas treatment. With their random arrangement of the webs, ceramic foams give a very advantageously low pressure drop together with significantly better mass transfer than extruded honeycombs which, owing to the extrusion technology, can have no webs in the flow direction. This applies particularly when the pore volume is more than 50%, preferably more than 70%, of the total volume of the catalyst support and the webs have thicknesses of less than 1 mm. Low pressure drops are particularly important in the application as supports in flue gas purification (DE-A 35 10 170), in motor vehicle exhaust catalysts (DE-A 37 31 888) or in the application as diesel exhaust filters (EP-A 312 501). Ceramic foams are also often used as filters for purifying very hot melts such as metal melts (U.S. Pat. No. 4,697,632) or for filtering hot gases (EP-A 412 931).

All these applications make use of the production of open-celled foams by infiltration of open-celled polymer foams. The inorganic materials claimed have as wide a variety as the applications. For foams having a low thermal expansion, materials claimed are lithium aluminum silicate or cordierite. Such foams have a particularly high resistance to drastic temperature changes, as is necessary for a motor vehicle exhaust catalyst (JP-A 6 1295 283). For melt filters for metals, on the other hand, inert behavior toward the metal melts is important. Use is here made of $\alpha$-aluminum oxide, silicon carbide, $SiO_2$ or, in particular, mixtures thereof (EP-A 412 673). Silicon carbide foams are particularly suitable for the filtration of iron melts or melts of ferrous alloys (WO 88/07403). Silicon nitride is also described for ceramic open-celled foams used for filtration (DE-A 38 35 807). EP-A 445 067 describes $Y_2O_3$-stabilized zirconium oxide or mixed $ZrO_2/Al_2O_3$ ceramics as filters for molten metals.

Apart from the infiltration of polymer foams with inorganic slip materials, followed by drying, binder burnout and sintering, other methods have also become known for producing inorganic foams:

WO 95/11752 describes a process in which metals are chemically deposited on an open-celled polymer foam and after drying and pyrolysis there is obtained an open-celled metal foam which can be converted by oxidation into a ceramic foam. Here too, drying and pyrolysis are very complicated. Drying and pyrolysis are avoided in the process claimed in EP-A 261 070, in which ceramic foams are produced starting from a metal foam, preferably an aluminum foam, and then oxidizing this to form a metal oxide. A disadvantage of this process is that a metal foam has to be produced beforehand in some way. A process for producing metal foams (Fraunhofer-Institut für Angewandte Materialforschung, Bremen) starts with aluminum powder into which titanium hydride powder is mixed. The powder mixture is heated in a mold to just above the melting point of aluminum, with the titanium hydride being decomposed and the hydrogen formed foaming the molten aluminum. In this case, which cannot be generalized, the melting point of the aluminum matches the temperature range for decomposition of the titanium hydride.

In other known processes too, hydrogen is used as blowing agent for producing inorganic foams: it is thus known that strongly alkaline alkali metal silicates or alkali metal aluminates can be mixed with a powder of a base metal, preferably aluminum, so that the metal dissolves and hydrogen is generated as blowing gas. After the foams have been dried, they have to be treated with ammonium compounds in order to remove alkali metal ions which have an adverse effect. After sintering, such foams can contain less than 0.5% of alkali metal ions (EP-A 344 284, DE-A 38 16 893).

A "dry" process for producing ceramic foams comprises mixing ceramic powders with products of volcanic eruptions which, on heating to 900–1400° C., foam the resulting melt with gas evolution (JP-A 6 0221 371). Foams produced in this way are used in particular as thermally insulating (closed-celled) building material.

JP-A 2 290 211 describes a process for producing ceramic metal melt filters in which resin particles of various sizes, preferably of foamed polystyrene, are joined together and the interstices are infiltrated with a ceramic slip material. The organic constituents are burnt out after drying at from 500 to 600° C. and the foam is then sintered in air at from 1200 to 1800° C.

Open channels in ceramic foams can also be produced by applying short organic fibers such as cotton, polyamide fibers, acrylic fibers or else inorganic fibers such as graphite fibers to a sticky underlay, applying further fibers with an organic binder, infiltrating the fiber lay-up with inorganic slip material, then drying, pyrolyzing and sinterng it (EP-A 341 230). For this is said to produce foams having a pore volume of less than 35%. Applications are as filters for molten metals.

Finally, it is also known that ceramic foams can be produced by admixing aqueous ceramic slip materials with aqueous polymer dispersions, beating the mixture like cream to give a foam until it has a volume of from 1.5 to 10 times the initial volume, allowing the foam to run into a mold, drying it, burning out the organic auxiliaries and then sintering it (EP-A 330 963). In this process, the proportion by weight of inorganic material is from 65 to 95% and the proportion by weight of dispersion (dry mass) is from 5 to 50%, which has to be removed by pyrolysis. Disadvantages in the use of such open-celled inorganic foams are that relatively large bubbles are also beaten in and that a large proportion of the foam cells are closed. On beating, air is incor-porated, the cells formed are stabilized by the polymer dispersion and only some of them are ruptured on drying.

Attempts to highly fill the reactive components of polyurethane foams with inorganic powders and to react these with one another to directly produce a highly filled open-celled polyurethane foam from which, owing to the open-celled nature, the organic constituents could be burnt out are beset by problems. The molecular weight of the components at the commencement of foaming is so low that the foaming mixture is not elastic enough, resulting in the foam bubbles bursting too early and the blowing gas, $CO_2$, escaping largely unutilized. The insufficient elasticity also results in rapid formation of cracks in the mass, from which cracks the blowing gas likewise flows unutilized.

If, when producing open-celled inorganic sintered foams from aqueous slips, the flow properties of the material are changed during foaming in such a way that the open pore structure is stabilized, good products can be produced. Here, a high proportion by volume of inorganic powder is employed. Sintering gives dense, high-strength webs, which can be seen from the shrinkage on sintering which corresponds to the proportion by volume of water and auxiliaries. Withdrawal of small amounts of water can essentially increase the strength of the foaming composition in such a way that the cell walls are stabilized and no longer collapse, although the stabilizing pressure difference is eliminated on cell opening. However, even this process can be improved further, specifically with regard to the reproducibility and definity of the foaming results.

It is an object of the present invention to provide a process and foams which permit excellent control of the foam structure. In particular, foaming at room temperature without organic blowing agents should be made possible and the foaming should be reproducible.

We have found that this object is achieved by a process for stabilizing a foamed starting material which comprises
1. foaming a starting slip material comprising the following constituents:
   a. inorganic sinterable material,
   b. a source of blowing gas,
   c. a framework former which forms a framework when the pH of the starting slip material is changed,
   d. pH control material,
   e. liquid,
   f. if desired, one or more of the following materials:
      dispersant
      binder
      viscosity modifier; and
2. changing the pH of the starting slip material to initiate or accelerate the formation of the framework from the framework former.

The present invention further provides a process for producing inorganic sintered foam parts, which comprises
1. in a foaming stage, foaming a starting slip material having a composition as defined above,
2. in a pH change stage, changing the pH of the starting slip material such that the framework former produces a framework which stabilizes the foamed starting slip to give a stabilized foam body,
3. if desired, removing the stabilized foam body from the mold in a demolding stage and drying it,
4. in a framework removal stage, removing the stabilizing framework from the stabilized foam body to form a green foam body and
5. sintering the green foam body in a sintering stage to form the inorganic sintered foam part.

In particular and preferably, addition according to the present invention of additives enables foaming to be controlled such that the foaming composition first has an alkaline pH of 8–10, but the pH changes towards the end of the foaming process during cell opening to lower values of 3–6 in the acid range and this pH change is utilized for curing a water-soluble urea-formaldehyde resin present in the mixture within 1–5 minutes, thus stabilizing the foam.

The present invention is described in detail below and illustrated by means of preferred embodiments:

The invention thus provides a process for stabilizing a foamed starting slip material. This process comprises
1. foaming a starting slip material comprising the following constituents:
   a. inorganic sinterable material,
   b. a source of blowing gas,
   c. a framework former which forms a framework when the pH of the starting slip material is changed,
   d. pH control material,
   e. liquid,
   f. if desired, one or more of the following materials:
      dispersant
      binder
      viscosity modifier;
2. changing the pH of the starting slip material to initiate or accelerate the formation of the framework from the framework former.

Preference is here given to a process procedure such that the initiation or acceleration of the formation of the framework from the framework former occurs essentially after foaming.

According to the present invention, the amounts of blowing gas source, pH control material and liquid are preferably matched to one another such that the liquid and the pH control material form an acid which first reacts with the source of blowing gas to liberate the blowing gas for foam formation and such that the further acid formed then reacts with the framework former to produce the framework which stabilizes the foam.

The liquid used for the starting slip materials is preferably water. In particular, the inorganic powder is dispersed in an initially charged amount of water with the aid of a dispersant with the proportion by volume of inorganic powder being sufficient for impermeable cell walls or webs are formed later on sintering. Depending on the sinter activity and surface area of the powders used, this proportion by volume is preferably from 30 to 50% by volume of the total mixture.

As inorganic sinterable materials, preference is given to using inorganic powders. Particular preference is given to powder materials selected from the group consisting of:
  metal powders
  mineral powders
  ceramic powders
  metal carbide powders
  metal nitride powders.

The inorganic powder serves to form the webs of the open-celled inorganic foam. These powders are ceramic materials such as aluminum oxide, zirconium oxide partially or fully stabilized with magnesium oxide or yttrium oxide, silicon carbide, silicon nitride including its customary sintering aids such as aluminum oxide and yttrium oxide, cordierites, mullite, tungsten carbide, titanium carbide, tantalum carbide, vanadium carbide, titanium nitride, tantalum nitride or metal powders such as iron, cobalt, nickel, copper, silver, titanium, steel powder or alloy powders of iron-, nickel- or cobalt-based alloys.

The ceramic powders can also be mixed with one another, the carbides, nitrides or metal powders can likewise be mixed with one another.

The mean particle sizes of the ceramic powders are from 0.1 to 10 μm, preferably 0.3 to 2 μm; the particle sizes of the metal powders are from 1 to 50 μm, preferably 2 to 20 μm.

Sources of blowing gas which can be used are, in particular, compounds which liberate a blowing gas when the pH is changed. Particularly suitable are those compounds which give off carbon dioxide in an acid medium. Blowing agents used are, in particular, ammonium carbonate, ammonium carbamate or preferably ammonium hydrogen carbonate which give off carbon dioxide as blowing gas in an acid medium. They are used in amounts of from 0.3 to 2% by weight, based on the inorganic powder.

Framework formers used according to the present invention are preferably one or more compounds which form strong bonds to one another when the pH is changed and thus stabilize the foams. Particularly suitable are crosslinkable resins. Particularly suitable is a component which crosslinks at room temperature as a result of a pH change, preferably low molecular weight, water-soluble urea-formaldehyde resins. These framework formers can be used in amounts of from 2 to 10% by weight (calculated as solid), based on the inorganic powder. A good overview of commercially available urea-formaldehyde resins and their uses is given in the book "Aminoplaste" by A. Bachmann and T. Bertz, VEB Deutscher Verlag für Grundstoffindustrie, Leipzig 1970 which has a specific chapter on foams starting on page 153.

For the purposes of the present invention, preference is given to using resins which can be crosslinked rapidly at room temperature. Such resins have a 2.8- to 3-fold excess of formaldehyde and crosslink best at a pH of from 3.5 to 5. The use according to the invention of the resins leads to open-pored foams which can be removed from the mold only from 5 to 10 minutes after the foaming process owing to their high mechanical stability.

According to the present invention, the pH control material preferably comprises compounds which together with the liquid, in particular with the water, effect a pH change. Acid formers used are preferably organic carboxylic anhydrides which are insoluble in the aqueous mixture and liberate $H_3O^+$ ions only during the foaming process as a result of hydrolysis. Acid formers used are, for example, phthalic anhydride, pyromellitic dianhydride or maleic anhydride, with the reactivity increasing in that order.

The foaming rate can be adjusted by using anhydride powders of various particle sizes. The larger the particle size, the lower is the hydrolysis rate. The smaller the anhydride particles, the larger are the specific surface area, the hydrolysis rate and the foaming rate. Optimum particle sizes are in the range of from 1 to 200 μm, preferably 10 to 100 μm.

In the process of the present invention, the ratio of acid former to blowing agent can be employed particularly advantageously for controlling the foam properties. In particular, it is set such that the blowing agent is always present in a molar deficiency based on the acid former, so that after the blowing agent is consumed the pH can change from 8 to 10 to from 3 to 6 in the acid range. For example, less than one equivalent of ammonium hydrogen carbonate has to be present per equivalence of carboxylic acid.

Preference is given to using starting slips which have one or more of the following features:

a. The starting slip material is an aqueous slip material.
b. The starting slip material contains from 30 to 60% by volume of the webforming, sinterable powder.
c. The starting slip material consists essentially of the following materials:

| a. | inorganic powder including sintering aid | 30–60 parts by volume |
|---|---|---|
| b. | vaporizable liquid, in particular water | 30–60 parts by volume |
| c. | dispersant | 0–4, preferably 0.5–3, parts by volume |
| d. | binder | 2–12, preferably 4–10, parts by volume |
| e. | blowing agent or blowing agent precursor | 1–8, preferably 2–6, parts by volume | d. The starting slip material contains viscosity modifiers in the form of water-soluble polymers, in particular uncrosslinked high molecular weight organic polymers, in particular in an amount of from 2 to 10% by weight (based on the sinterable powder material as 100% by weight), with preference being given to using polyvinylpyrrolidones, polyvinylformamides, polyvinyl alcohols.

e. The starting slip material contains a binder, in particular in an amount of from 1 to 6% by weight (based on the inorganic sinterable material as 100% by weight), preferably a polyacrylic ester dispersion.

In a further embodiment, the invention comprises a process for producing inorganic sintered foam parts. In this process, a starting slip material as defined herein is foamed in a foaming stage. In a pH change stage, the pH of the starting slip material is changed such that the framework former produces a framework which stabilizes the foamed starting slip to give a stabilized foam body. If desired, the stabilized foam body is removed from the mold in a demolding stage and dried. In a framework removal stage, the stabilizing framework is removed from the stabilized foam body to form a green foam body. The demolding stage and the framework removal stage are preferably carried out in direct succession in one apparatus. Finally, the green foam body is sintered in a sintering stage to form the inorganic sintered foam part.

In the process for producing sintered foam bodies, the starting slip material is preferably first shaped. This can be achieved, in particular, by introducing the starting slip material into a mold. Preference is here given to injecting the material. The starting slip material can also be extruded and subsequently divided up. It is also possible to extrude the material into flat sheets and to shape it by stamping. Finally, the material can also be compression molded.

The shaped starting slip material is foamed. Preference is given to adding the pH control material only shortly before shaping or only in the mold. Good results are achieved when the pH control material is, for example, stirred into the starting slip material in the mold or when the pH control material is introduced in an extruder in which the other constituents of the starting slip material are mixed and which then conveys the starting slip material into the mold or for dividing up.

The invention also provides an inorganic sintered body as is produced by the process of the present invention. The sintered bodies of the present invention can be used as catalysts or catalyst supports, in particular as supports. It is particularly advantageous to additionally provide the porous sintered body with catalytically active material or material which can be converted into catalytically active material, in particular one or more noble metals. Such a porous body is then a catalyst (which may still have to be activated). The metals or noble metals are here present in an amount of from 0.1 to 5% by weight, based on the entire porous body. Particularly suitable catalytically active materials for such porous bodies are platinum, palladium, cobalt, nickel, iron or copper.

As dispersant, it is possible to use stearic dispersants. Stearic dispersants have a surfactant structure in which a part of the molecule attaches itself to the powder to be dispersed, thus giving low viscosities and high solids loadings. Examples of such dispersants are tetramethylammonium oleate or tetrabutylammonium oleate. Amounts of from 0.5 to 3%, based on the mass of powder, are sufficient for dispersing ceramic powders; from 0.1 to 0.5%, based on the mass of powder, is required for dispersing the coarser metal powders.

Since the foaming process is favored in terms of the flowability of the composition by intermediate initial viscosities, it is also possible to add water-soluble uncrosslinkable high molecular weight organic polymers as viscosity modifiers in amounts of from 2 to 10% by weight, based on the powder. The amount of the viscosity-increasing water-soluble polymers has to be determined individually for each powder. If the viscosity is too low, the blowing gas escapes without foam formation; if it is too high, the foam formation is likewise hindered since the blowing gas escapes unutilized from cracks and crevices. The viscosity modifier should have an elasticity, i.e. elongation at break, which is as high as possible; crosslinked polymers therefore have only limited utility. After foaming and drying, the viscosity modifier provides stabilizing, binding properties in the foam. It increases the strength of the as yet unsintered foam body. Well suited viscosity modifiers are linear high molecular weight polyvinylpyrrolidones and their copolymers, polyvinylformamide and its copolymers or polyvinyl alcohols.

Effective binders are, in particular, aqueous polymer dispersions which on drying form films which bind the inorganic particles. They are used in amounts of from 1 to 6% by weight, based on the inorganic powder. Particular preference is given to dispersions of polyacrylic esters which form particularly sticky films.

The slip for the foams of the present invention is prepared without additional complicated apparatus in conventional mixers or kneaders. The optimum viscosity is most simply set visually. In each case, powder, dispersant, viscosity modifier or water is added to the formulation until the slip just still flows under its own weight. The proportion by volume of powder at which the flow limit is reached depends on the powder particle size or powder surface area. In the case of the comparatively low particle sizes of ceramic powders of from 0.3 to 2 $\mu$m, the flow limit is reached at from 30 to 50% by volume; in the case of the coarser metal powders having a mean particle diameter of from 2 to 20 $\mu$m, the flow limit is reached at from 35 to 55% by volume.

The manufacture of the open-celled inorganic foams of the present invention can be carried out either batchwise or continuously. In batchwise manufacture, foaming is carried out after preparation of the mix, if desired in a mold. In order to produce granules, the slip mix is divided up into pieces, if desired before the foaming process, and the pieces are then foamed to give irregularly shaped or spherical granules. The foamed part is dried at from 100 to 130° C. in a stream of air, then heated at a rate of from 3 to 5° C./min up to from 350 to 600° C. to completely remove the organic constituents, the material is left for 1 hour at from 350 to 600° C. and then further heated for the actual sintering process: Fe, Co, Ni, to, for example, from 1100 to 1200° C. under hydrogen, Cu to from 900 to 950° C., likewise under hydrogen, zirconium oxide to 1450° C. in air, aluminum oxide to 1650° C. in air or silicon carbide to 2250° C. under argon.

For continuous manufacture, the slip is prepared batchwise but then processed at room temperature by means of a continuously operating screw extruder to form extrudates. After exit from the die, these are foamed on an underlay moving along with them on a conveyor belt and dried in a downstream drying section. The carboxylic anhydrides serving as acid former, for example phthalicanhydride, are preferably metered in only when the composition is drawn into the screw extruder. If desired, the screw extruder additionally contains a mixing section for improving the distribution of the acid former.

The invention further provides inorganic sintered foam parts. These have an accessible, open pore volume of from 40 to 90% and pore sizes in the range of from 0.05 to 3 mm, preferably 0.1 to 2 mm. The preferred inorganic sintered materials are those defined herein.

The following examples illustrate preferred features and optimum formulations for the purposes of the invention.

EXAMPLES

A stirred vessel is charged with deionized water. While stirring, the dispersant, ammonium hydrogen carbonate as blowing agent, the viscosity modifier, urea-formaldehyde resin and binder dispersion are mixed into the water at room temperature.

The dispersant used is a 25% strength aqueous preparation of tetramethyammonium oleate, the viscosity modifier is a powder of a high molecular weight polyvinylpyrrolidone (Luviskol® K90, BASF AG), the binder is an acrylic ester dispersion having a solids content of 50% (Acronal® S 360D from BASF AG), the urea-formaldehyde resin is a 50% strength aqueous solution of a low molecular weight resin having a three-fold formaldehyde excess; the carboxylic anhydrides were milled to particle sizes of from 10 to 20 $\mu$m.

In the following table, the amounts of starting materials are based on the pure materials, the amount of water indicated is the total amount of water.

After mixing and dissolving the water-soluble components at room temperature, the inorganic powder, in the examples aluminum oxide powder having a mean particle size of about 1 $\mu$m, is stirred in a little at a time. After complete dispersion, the mixture is ready for foaming. For the foaming process, the amounts indicated of carboxylic anhydride are mixed in over a period of about 1 minute. This can be carried out directly in a mold. The mold is then jiggled for a short time in order to distribute the composition and to remove large bubbles of air. The composition then begins to foam and rise to a volume of from 2 to 5 times the initial volume. After foaming, which directly gives open pores, the foam is left for a further 5 to 10 minutes and the foamed moldings can then be taken out by opening the mold.

The formulations shown in Examples 1 to 4 were used to foam cylinders having diameters of 100 and 55 mm and heights of about from 80 to 90 mm. These cylinders were dried for 10 hours at 130° C. in a convection drying oven, then transferred to a sintering furnace and heated at a heating rate of 5° C./min from room temperature to 300° C., held for 1 hour at 300° C., then heated at 5° C./min to 600° C., held for 1 hour at 600° C., then heated at 5° C./min to 1650° C., held for 3 hours at 1650° C. and then the furnace was allowed to cool naturally.

This gave stable, open-porosity cylindrical foam bodies which had shrunk uniformly in diameter and height by 24, 23, 18 and 21% for Examples 1 to 4 respectively. The mean pore sizes were about from 0.5 to 2 mm in all examples, the proportion of pores was 78, 70, 77 and 83% by volume.

Mixes for Examples 1 to 4

| Fehler! Textmarke nicht definiert. | Example No. | | | |
|---|---|---|---|---|
| Component as pure material in grams | 1 | 2 | 3 | 4 |
| Dispersant (Tetramethylammonium oleate) | 1.5 | 1.5 | 2 | 6 |
| Blowing agent (Ammonium hydrogen carbonate) | 4.5 | 4.5 | 2 | 6 |
| Binder (Acrylic ester dispersion) | 15 | — | — | 10 |
| Water | 55 | 56 | 45 | 40 |
| Viscosity modifier (Polyvinylpyrrolidone) | 6 | 11 | 8 | 3 |
| Urea-formaldehyde resin | 18 | 14 | 16 | 12 |
| Carboxylic anhydride | | | | |
| Maleic anhydride | 10 | 10 | — | — |
| Phthalic anhydride | — | — | 8 | — |
| Pyromelltic anhydride | — | — | — | 8 |
| Aluminum oxide | 210 | 200 | 210 | 210 |

The foam bodies produced in the examples are open-pored, highly gas-permeable foam bodies having a high hardness. They are suitable, for example, as catalyst supports.

We claim:

1. A process for stabilizing a foamed starting slip material, which comprises:
   1) foaming a starting slip material comprising the following constituents:
      a) inorganic sinterable material,
      b) material which forms carbon dioxide as a blowing gas when contacted with an acid material,
      c) material which forms a framework when the pH of the starting slip material is reduced,
      d) material which forms an acid on hydrolysis in an amount more than that required to react with the blowing gas forming material,
      e) water,
      f) optionally, one or more of the following materials:
         dispersant
         binder
         viscosity modifier, and
   2) reducing the pH of the starting slip material to initiate or accelerate the formation of the framework from the framework former.

2. A process for producing inorganic sintered foam parts, which comprises
   1) introducing a starting slip material, having a composition as is defined in claim 1 into a mold,
   2) in a foaming stage, foaming the starting slip material, to form a foam,
   3) in a pH reducing stage, reducing the pH of the starting slip material such that the framework former produces a framework which stabilizes the foamed starting slip to give a stabilized foam body,
   4) optionally removing the stabilized foam body from the mold in a demolding stage and drying it,
   5) in a framework removal stage, removing the stabilizing framework from the stabilized foam body to form a green foam body, and
   6) sintering the green foam body in a sintering stage to form the inorganic sintered foam part.

3. A process as defined in claim 1, wherein the inorganic sinterable material used comprises
   a powder material selected from the group consisting of: metal powders, mineral powders, ceramic powders, metal carbide powders and/or metal nitride powders.

4. A process as defined in claim 1, wherein the source of blowing gas used comprises one or more compounds selected from the group consisting of compounds which give off carbon dioxide in an acid medium.

5. A process as defined in claim 1, wherein the framework former used comprises compounds which form strong bonds with one another when the pH is reduced, which effect mechanical strengthening of the foam.

6. A process as defined in claim 1, wherein the acid-forming material used comprises one or more of compounds which together with the water effect a pH change to values of from 3 to 6.

7. A process as defined in claim 1, wherein the amounts of blowing gas-forming material, acid-forming material and water are matched to one another such that the water and the acid-forming material form an acid which first reacts with the source of blowing gas to liberate the blowing gas for foam formation and such that the further acid formed then reacts with the framework former to produce the framework which stabilizes the foam.

8. A process as defined in claim 1, wherein the starting slip material is an aqueous slip material and contains from 30–60% by volume of a sinterable material.

9. A process defined in claim 6, wherein the acid-forming material is added to the starting slip material only shortly before shaping.

* * * * *